United States Patent
Beresnev et al.

(10) Patent No.: US 9,454,004 B2
(45) Date of Patent: Sep. 27, 2016

(54) APPARATUS FOR COHERENT BEAM COMBINING IN AN ARRAY OF LASER COLLIMATORS

(71) Applicant: U.S. Army Research Laboratory ATTN: RDRL-LOC-I, Adelphi, MD (US)

(72) Inventors: Leonid A. Beresnev, Columbia, MD (US); Jony J. Liu, Olney, MD (US); Gary W. Carhart, Elkton, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 277 days.

(21) Appl. No.: 14/039,665

(22) Filed: Sep. 27, 2013

(65) Prior Publication Data

US 2014/0231618 A1   Aug. 21, 2014

Related U.S. Application Data

(60) Provisional application No. 61/709,209, filed on Oct. 3, 2012.

(51) Int. Cl.
*H01S 3/13* (2006.01)
*G02B 27/09* (2006.01)
*G02B 27/00* (2006.01)
*H01S 3/23* (2006.01)
*H01S 3/00* (2006.01)

(52) U.S. Cl.
CPC ......... *G02B 27/0087* (2013.01); *H01S 3/1307* (2013.01); *H01S 3/005* (2013.01); *H01S 3/2383* (2013.01)

(58) Field of Classification Search
CPC .......... G01B 27/0927; G01B 27/0087; G01B 27/0961; G01B 27/0966; H01S 3/13; H01S 3/10053; H01S 3/1305; H01S 3/1307; H01S 3/005; H01S 3/0071; H01S 3/2383
See application file for complete search history.

(56) References Cited

U.S. PATENT DOCUMENTS

| | | | | |
|---|---|---|---|---|
| 5,113,064 A | * | 5/1992 | Manhart | 250/201.9 |
| 5,761,234 A | * | 6/1998 | Craig et al. | 372/75 |
| 6,678,294 B1 | * | 1/2004 | Komine et al. | 372/38.01 |
| 7,164,702 B1 | * | 1/2007 | Liu et al. | 372/50.21 |
| 7,221,499 B2 | * | 5/2007 | Rice et al. | 359/349 |
| 7,336,363 B2 | * | 2/2008 | Rothenberg | 356/450 |
| 7,436,588 B2 | * | 10/2008 | Rothenberg et al. | 359/349 |
| 7,468,832 B2 | * | 12/2008 | Rothenberg et al. | 359/341.41 |
| 7,729,398 B2 | * | 6/2010 | Livingston | 372/30 |
| 7,864,820 B2 | * | 1/2011 | Shimotsu | 372/6 |

(Continued)

*Primary Examiner* — John Lee
(74) *Attorney, Agent, or Firm* — Alan I. Kalb

(57) ABSTRACT

A method and apparatus for coherent beam combining in an array of laser beam collimators. The array of laser beam collimators includes an array of a plurality collimating lenses, each lens intercepting a respective one of a plurality of divergent laser beams. Each collimating lens is joined with adjacent collimating lenses such that an output aperture is formed with a common vertex of the adjacently joined collimating lenses. A concave mirror is positioned a distance from the common vertex for receiving a fraction of each of the collimated laser beams that passed through a portion of each of the collimating lenses that are adjacent to the common vertex, and then providing reflected fractional collimated laser beams. A sensor intercepts the reflected fractional collimated laser beams so as to provide a signal that is applied to synchronize the phase of each of the collimated laser beams.

20 Claims, 13 Drawing Sheets

(56) References Cited

U.S. PATENT DOCUMENTS

| | | | |
|---|---|---|---|
| 7,970,040 B1* | 6/2011 | Sprangle et al. | 372/98 |
| 2005/0036029 A1* | 2/2005 | Pilossof et al. | 347/241 |
| 2005/0135815 A1* | 6/2005 | Gerwe et al. | 398/188 |
| 2006/0132903 A1* | 6/2006 | Shakir et al. | 359/333 |
| 2006/0198402 A1* | 9/2006 | Hodgson et al. | 372/22 |
| 2008/0253417 A1* | 10/2008 | Livingston | 372/38.02 |
| 2009/0185176 A1* | 7/2009 | Livingston et al. | 356/237.2 |
| 2011/0032602 A1* | 2/2011 | Rothenberg | 359/341.1 |
| 2011/0032603 A1* | 2/2011 | Rothenberg | 359/341.1 |
| 2011/0032604 A1* | 2/2011 | Rothenberg et al. | 359/341.4 |
| 2012/0051049 A1* | 3/2012 | Huang | 362/235 |
| 2012/0212929 A1* | 8/2012 | Li | 362/19 |
| 2012/0243105 A1* | 9/2012 | Sasamuro et al. | 359/641 |
| 2013/0322075 A1* | 12/2013 | Hadrath | 362/235 |
| 2014/0152968 A1* | 6/2014 | Mizumura et al. | 355/67 |
| 2014/0231618 A1* | 8/2014 | Beresnev et al. | 250/201.9 |

* cited by examiner

APPARATUS FOR COHERENT BEAM COMBINING IN AN ARRAY OF LASER COLLIMATORS

CROSS REFERENCE TO RELATED APPLICATIONS

This application claims benefit of U.S. provisional patent application Ser. No. 61/709,209, filed Oct. 3, 2012, which is herein incorporated by reference.

GOVERNMENT INTEREST

Governmental interest—The invention described herein may be manufactured, used and licensed by or for the U.S. Government.

FIELD OF INVENTION

Embodiments of the present invention generally relate to coherent laser beam combining in an array of laser beam collimators and, more particularly, to a method and apparatus for phase-locking of a plurality of laser beams in the array.

BACKGROUND OF THE INVENTION

One known Coherent Beam Combining system (CBC) is based on a sparse multi-aperture array of fiber optic collimators. As a metric for external active control of phase-locking a technique called the power in the bucket (PIB) is used. The PIB technique uses the intensity of the photons returned from a target for feedback control of phase shifters that control the phase of the laser beam sources. FIG. 1 illustrates such a system.

The travel time of the return photons from the target is variable due to reliance of target reflection and atmospheric conditions, which may cause time delays that prevent optimization of the phase locking performance.

Preliminary phase locking of the source beams can solve these drawbacks using for instance beam splitters in the train of output laser beams, as shown in FIG. 2. Here, the CBC system with external phase-locking uses portions of beamlets split from the power train by means of beam splitters placed in a near-field of the laser beam power train. The overlapping of these beamlet portions near the focal plane of a focusing lens yields constructive interference spots, at least one of which is selected by use of a pinhole. A photo-sensor placed behind the pinhole is used to indicate an intensity for the selected spot, which intensity is used as a metric for active feedback control of the phase of the source beams. However, use of beam splitters which are external to the fiber collimators are disadvantageous in that they can cause wave front power aberrations in the laser beams, they are bulky, and delicate elements make the system heavy and non-reliable, especially for mobile applications.

FIGS. 3A and 3B show side and end schematic views of an arrangement that uses the internal photons of constituent laser beams, that is, before the photons reach the output collimating lenses. These photons are intercepted in periphery areas of the divergent (Gaussian) beams, which are parasitic beam-tails that remain inside of the beam array. More specifically, for internal phase-locking of wave fronts of an array of fiber optic collimators, the periphery areas of Gaussian beams (i.e., beam tails) are used, which beam tails, in one embodiment, are clipped before reaching the output collimating lenses. FIG. 3A illustrates the internal phase-locking of neighbor fiber optic collimators 101 and 102 using beam tails 110-2 and 120-1 of Gaussian beams 110 and 120. Mirrors or diffractive optic elements (DOE) 600-1 and 600-2 intercept/clip the beam tails 110-2 and 120-1 and re-direct them to the back of the array where they are focused on a plane near a pinhole photodetector. The pinhole selects the constructive interference spot of these beams after their overlap near the focal plane. An intensity signal from the photodiode placed behind of the pinhole provides a metric for internal feedback phase-locking of neighbor beamlets. A simplest example includes two channels as shown in FIG. 3A. In the case of hexagon packing of sub-apertures, instead of two, three mirrors 600-1, 600-2, 600-3 are used to intercept the beam tails of three adjacent sub-apertures 210, 220, 230.

Drawbacks of the internal phase-locking:
Diffractive optic elements (DOE) or precision assembly of three parabolic sub-mirrors or mini-holograms (in case of hexagonal beamlet packaging) intercepting the Gaussian beam tails, are complicated and expensive optical devices.
DOEs or assemblies of sub-mirrors are inside of array, causing the problems of precision alignment and possible thermal aberration in case of high beams power.
The size of interference spot behind of array is very small (typically 5-15 microns), causing the problem of alignment and stability of the pinhole with small diameter.

BRIEF SUMMARY OF THE INVENTION

A method and apparatus for coherent laser beam combining in an array of laser beam collimators as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
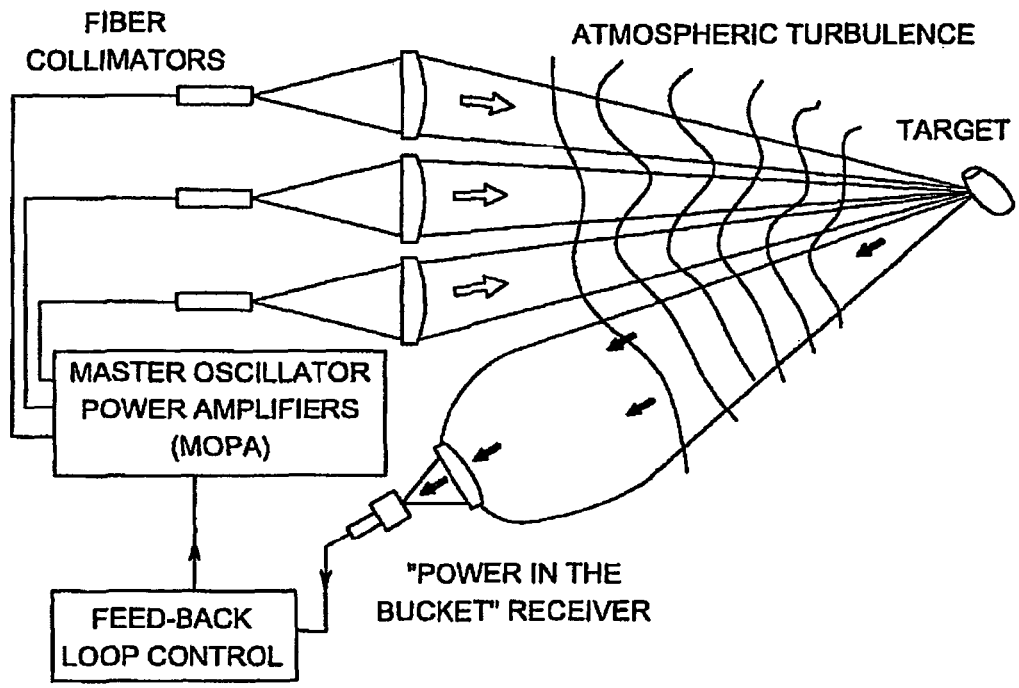
FIG. 1 illustrates a known Coherent Beam Combining system (CBC) based on sparse multi-aperture array of fiber optic collimators.
Figure 2:
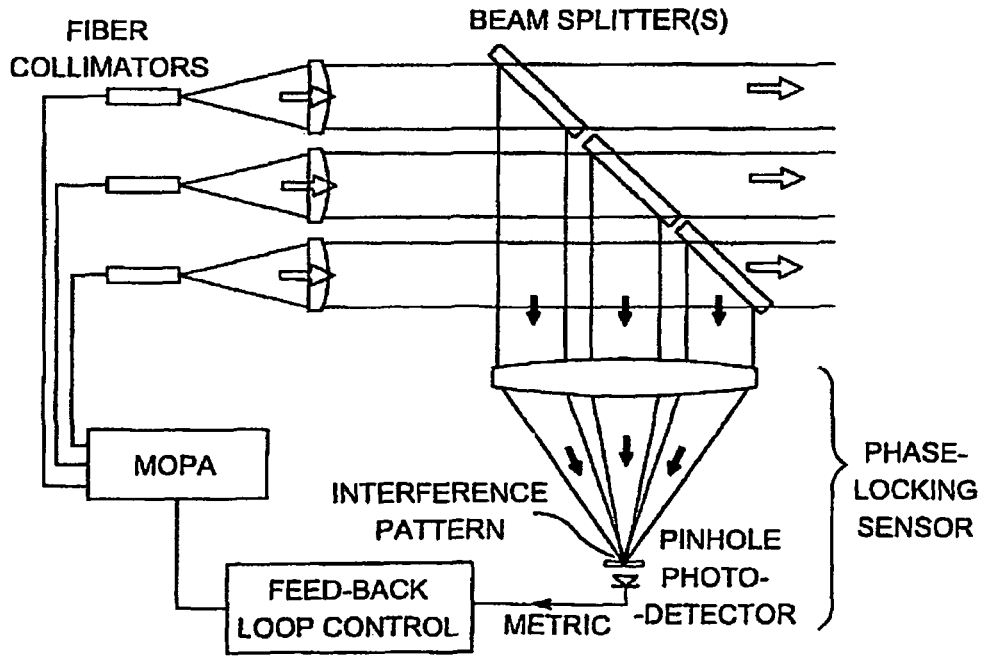
FIG. 2 illustrates a known CBC system including being splitters in the train of output laser beams.

Embodiments of the present invention generally relate to coherent laser beam combining in an array of laser beam collimators and, more particularly, to a method and apparatus for coherent beam combining in an array by providing an array of a plurality of laser beams and an array of a corresponding plurality of adjacently joined collimating lenses, each lens intercepting a respective laser beam so as to provide at an output side of the each collimating lens a collimated laser beam, wherein each collimating lens is joined with adjacent collimating lenses such that an output aperture is formed with a common vertex of the adjacently joined collimating lenses. A concave mirror positioned a distance from the common vertex so as to receive a fraction of each of the collimated laser beams that passed through a portion of each of the collimating lenses that are adjacent to the common vertex, and reflect said fractional collimated laser beams. A sensor intercepts the reflected fractional collimated laser beams so as to provide a signal that is applied to synchronize the phase of each of the collimated laser beams.

In a further embodiment parasitic radiation of the divergent beams are intercepted by a mask positioned before the collimating lenses, the mask comprising a combination of Partially Reflecting-Partially Absorbing (PR-PA) plates which dissipate the intercepted parasitic radiation by means of external cooling.

In a further embodiment an optical sensor measures the photons returned from the target and a motorized displacement of the optical sensor aligns the non-common path differences of wave fronts of the laser beams to modulo $2\pi$. In one embodiment, the optical sensor comprises a pin hole and a photodiode detector. In an alternative embodiment, a two dimensional imager comprises the optical sensor, and the size and position of the imaging area is adjusted so as to simulate the pin hole, the photodiode detector and an X-Y movement of the photodiode detector.

More particularly, embodiments of the present invention:

a) provide an array of plurality of adjacently positioned laser beam sources, each source projecting along a predetermined path a divergent laser beam having a Gaussian profile;

b) position in the predetermined path of each divergent laser beam a corresponding one of a plurality of mask elements, each mask element having a shape adapted for clipping periphery areas of the divergent laser beam passing therethrough so as allow a substantial portion of the Gaussian profile of the beam to continue on its predetermined path;

c) position a respective one of a corresponding plurality of collimating lenses in the predetermined path of each divergent laser beam after said beam has passed through a corresponding mask element, wherein the shape of each collimating lens corresponds substantially with the shape of the corresponding mask elements and the positioning of the collimating lenses are such that each collimating lens intercepts a substantial portion of the Gaussian profile of the corresponding divergent laser beam which passed through a corresponding mask element (such as 100% of the beam profile), so as to provide at an output aperture of each collimating lens a corresponding collimated laser beam, and wherein each collimating lens is joined with adjacent collimating lenses such that an output aperture of the array is formed with a common vertex of the adjacently joined collimating lenses;

d) position a concave mirror a distance from the common vertex for receiving a fraction of each of the collimated laser beams that passed through a portion of each of the collimating lenses that are adjacent to the common vertex, and providing reflected fractional collimated laser beams; and e) intercept the reflected fractional collimated laser beams with a sensor so as to provide a signal that is applied to synchronize the phase of the laser beam sources that provided the fractional collimated laser beams.

In an alternative embodiment, the mask elements are not used, and instead the array of collimating lenses are positioned so as to intercept the Gaussian profile of the divergent laser beam so as to have a substantial fill factor, such as 90% or greater, and preferably 95% or greater. In such an embodiment, the parasitic radiation passing through the adjacent lenses is shielded by use of a heat dissipating tube surrounding the output aperture of the array and having a diameter slightly larger than output aperture of array.

Various embodiments of a method and apparatus for coherent laser beam combining in an array of laser beam collimators are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve, physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 4:
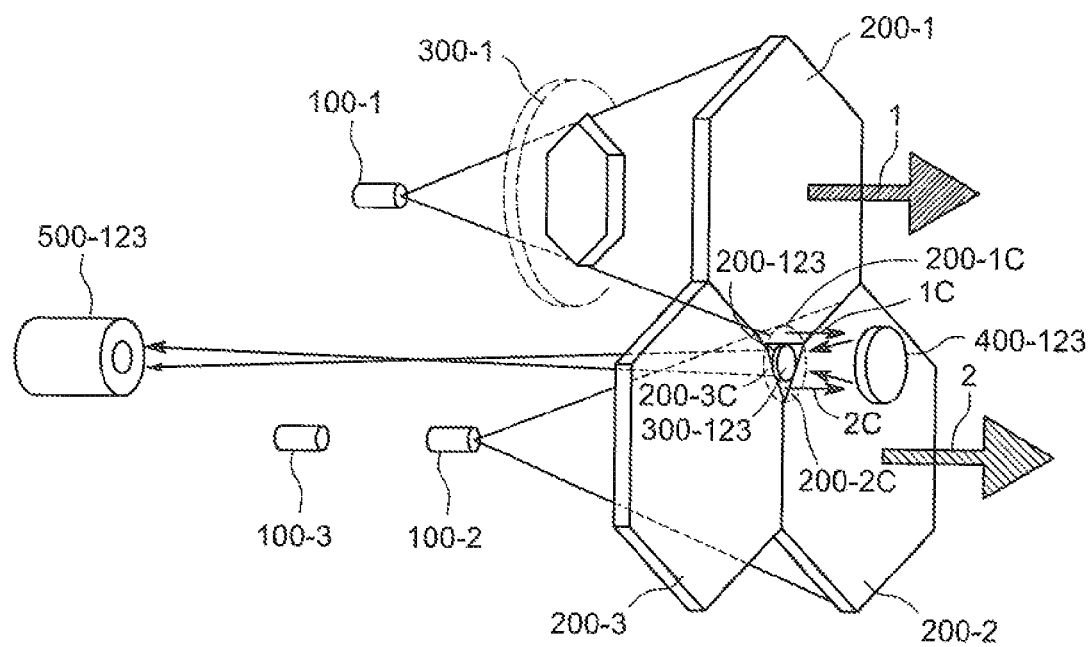
FIG. 4 illustrates a schematic view of one embodiment of method and apparatus for coherent beam combining in an array of laser beam collimators.

FIG. 4 illustrates a schematic view of one embodiment of method and apparatus for coherent beam combining in the array of laser beam collimators.

Three neighbor lasers are shown as illustrative of a scalable unit in an array having a hexagon arrangement of sub-apertures. The scalable unit arrangement includes fiber lasers 100-1, 100-2 and 100-3 and output collimator lenses 200-1, 200-2 and 200-3 arranged so as to have in combination with mask clipping elements 300 an approximately 100% fill factor, thereby avoiding parasitic propagation of periphery areas of the beams. A vertex 200-123 comprises an opening formed at the corners of the three adjacent lens 200-1, 200-2 and 200-3. The opening 200-123 has a characteristic size d. A focusing micro-lens 300-123 having a diameter d is positioned in opening 200-123. In this embodiment a clipping mask 300-1 is illustrated as useful for clipping the divergent beam supplied by laser 100-1 to a shape which matches the shape of the corresponding collimator lens 200-1, resulting in substantially 100% filling of lens 200-1. In practice, a mask 300 would be provided for each lens 200. A spherical concave mirror 400-123 having a diameter D>d is positioned outside of the array and in alignment with the opening in the vertex. A key part of these embodiments are sub-areas 200-1C, 200-2C, 200-3C of lenses 200-1, 200-2, 200-3 near the vertex, which provide three collimated sub-beams 1C, 2C, 3C (sub-beam 3C is not shown). Hereinafter the collimated sub-beams 1C, 2C, 3C are also referred to as fractional beams 1C, 2C and 3C. A spherical micro-mirror 400-123 re-directs the sub-beams 1C, 2C and 3C to a sensor for developing a signal that is applied to synchronize the phase of each of the collimated laser beams. In this embodiment, the micro-mirror 400-123 re-directs the sub-beams 1C, 2C and 3C to the back of array via a focusing micro-lens 300-123.

Micro-mirror 400-123 and micro-lens 300-123 essentially form a telescope that provides overlapping of sub-beams 1C, 2C, 3C in between lasers 100-1, 100-2, 100-3, preferably on a focal plane positioned behind the lasers, and on which focal plane an interference pattern of sub-beams 1C, 2C and 3C occurs. In this embodiment a pinhole-photodetector assembly 500-123 is positioned for selecting the constructive interference spot of the interference pattern and providing a signal to control a processor (such pinhole-photodetector assembly and processors are well known to those of ordinary skill in this, art) which synchronizes (phase locks) the phases of the sources for the three output beams 1, 2, 3 (beam 3 is not shown).

Figure 13:
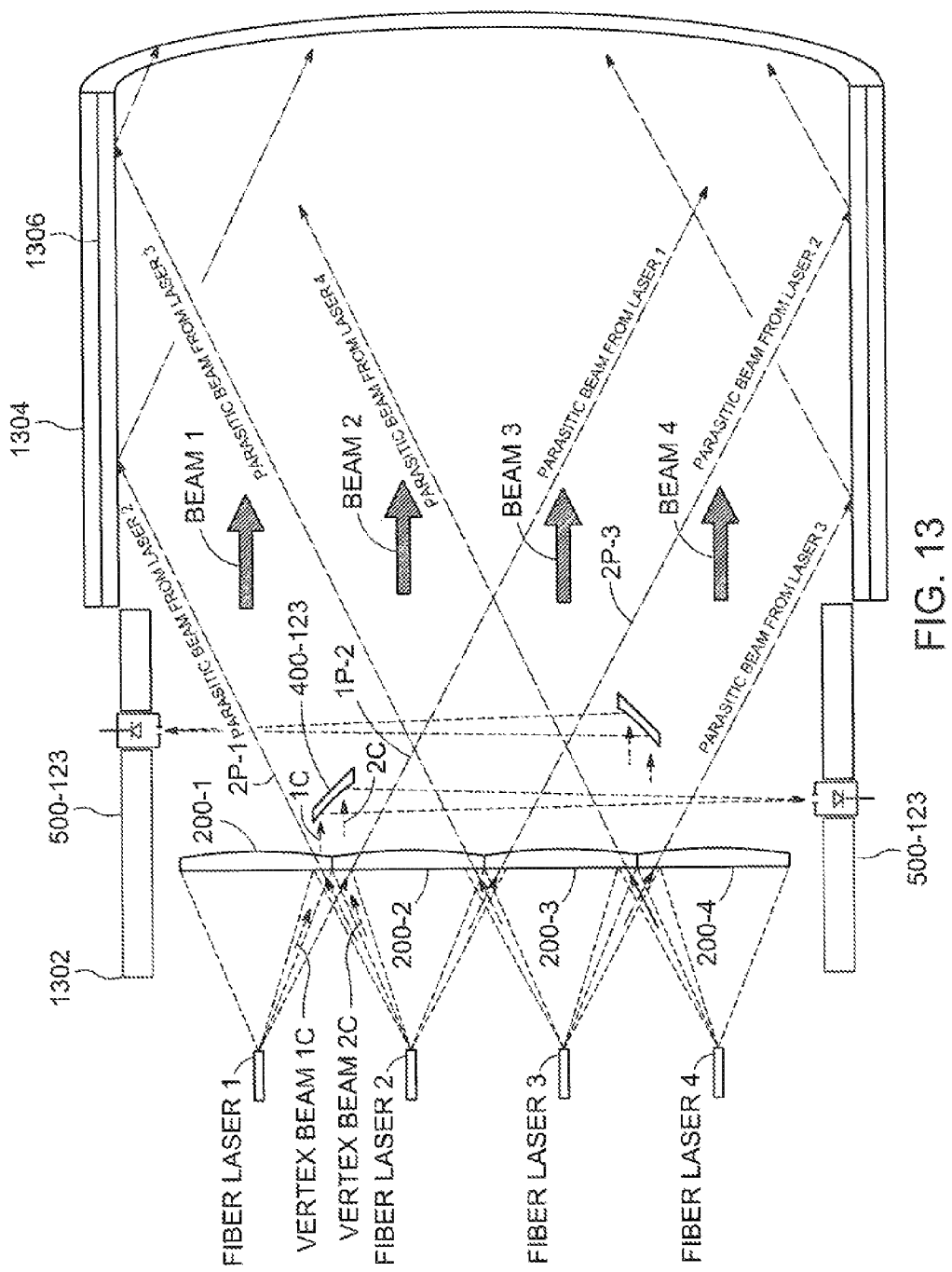
FIG. 13 illustrates a schematic view of another embodiment of a method and apparatus for coherent beam combining in an array of laser beam collimators that is similar to FIG. 4, but where no mask is used to pre-shape the laser beams so as to match the collimator lenses.
Figure 14:
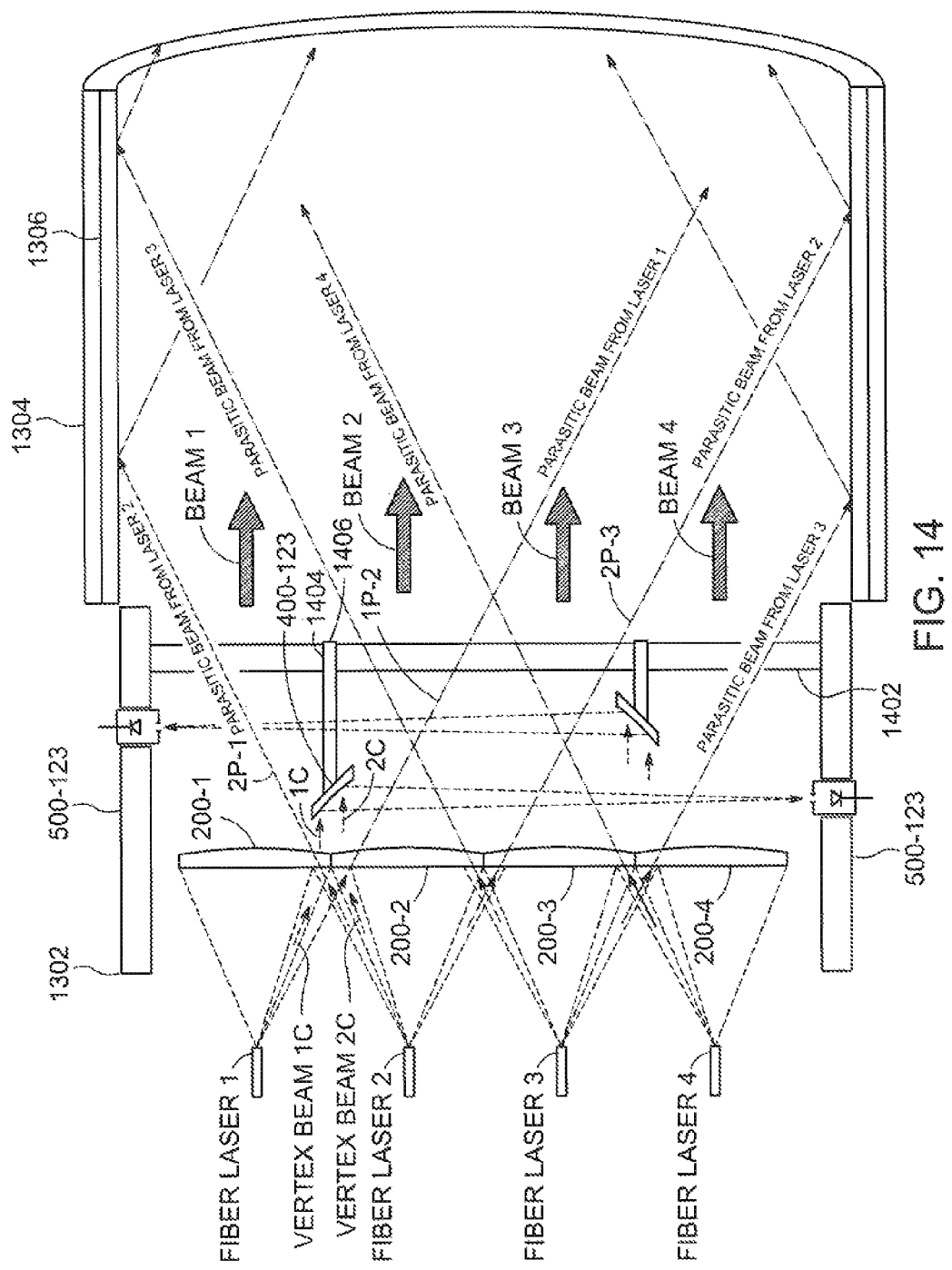
FIG. 14 illustrates a schematic view of a transport superstrate for accommodating the micro-mirror shown in FIG. 6 and FIG. 13.

Note, in an alternative embodiment to the FIG. 4 arrangement, such as shown in FIGS. 13 and 14, the sub-beams 1C, 2C and 3C are re-directed outside of the array instead of through it.

Figure 3A:
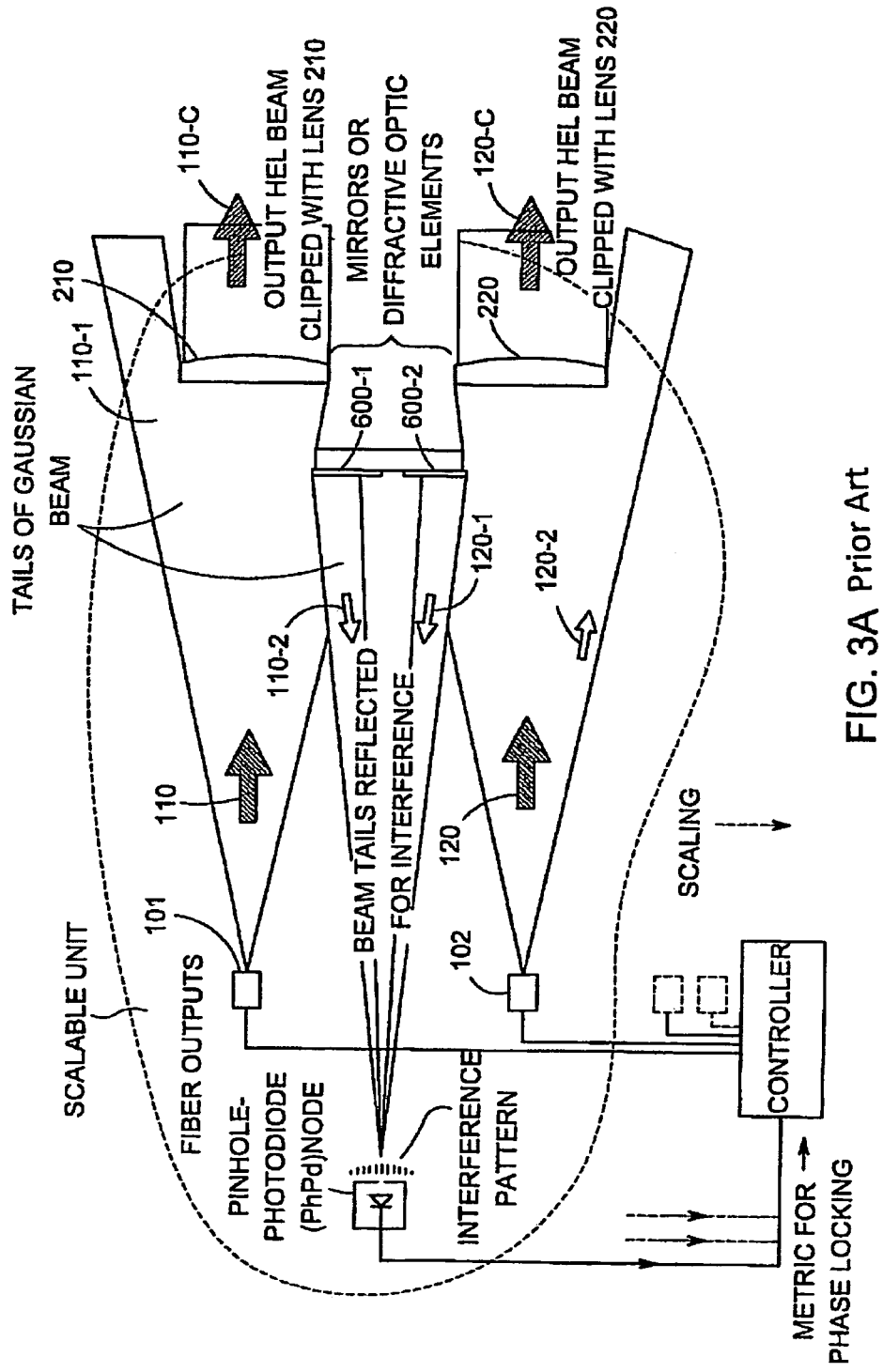
FIGS. 3A and 3B illustrate side and end schematic views of an arrangement for internal phase-locking of wave fronts of an array of fiber optic collimators using the periphery areas of Gaussian beams (beam tails), which are clipped by output lenses.
Figure 3B:
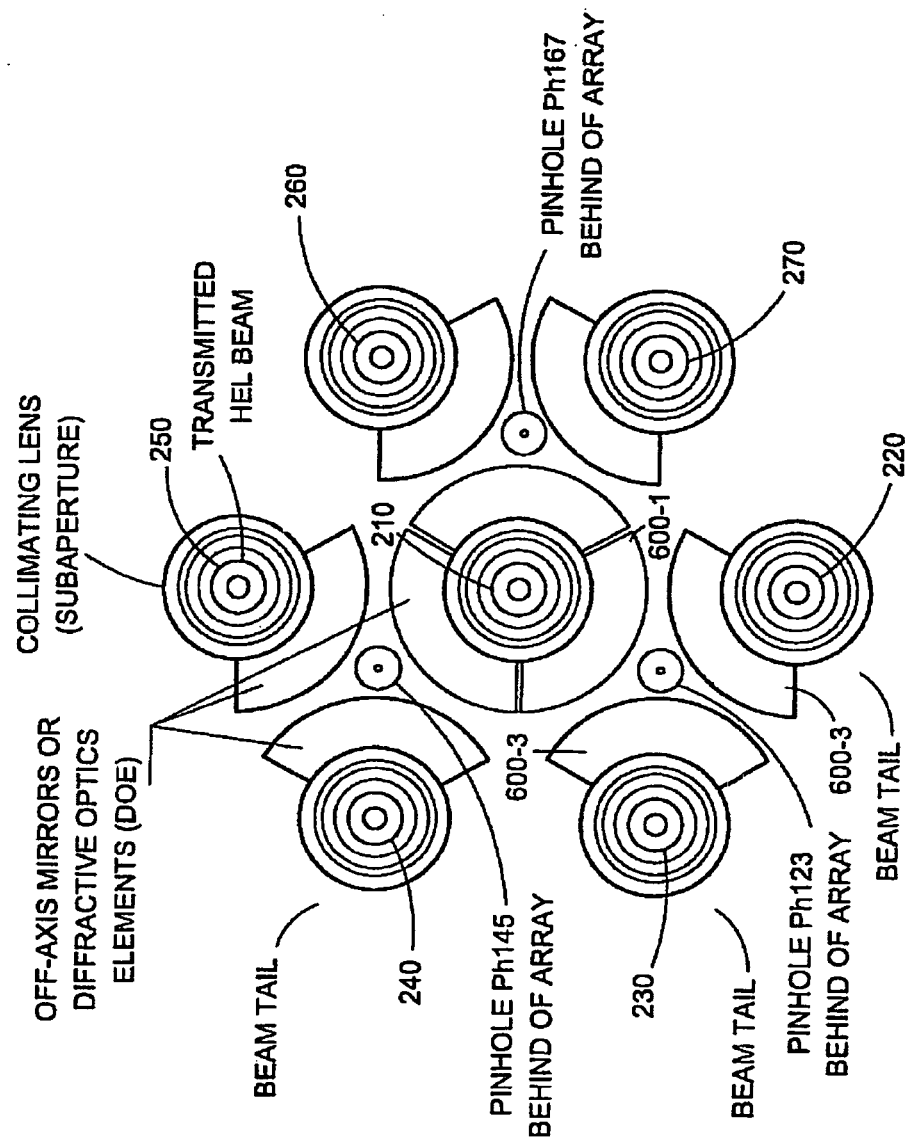

It is also noted that in a further alternative embodiment to the FIG. 4 arrangement, because of the small angle between re-directed sub-beams 1C, 2C and 3C (small in comparison to the large angle between the reflected beamlets shown in the FIG. 3A arrangement), sensor 500-123 could be a "synthetic pinhole-photodiode", that is, a plurality of photosensors formed electronically by computer control from an array of photosensitive pixels (such as an array of CCD, CMOS target, micro-bolometer, etc, elements). The shape and size of plurality of photosensitive elements that simulate the pinhole-photodiode can be adjusted by the computer to optimize the performance of the phase locking. In the described embodiments having small angles between the re-directed sub-beams (as compared with the large angles in embodiments such as shown by FIG. 3A), the characteristic size of the interference spot at the same dimensions of an array (such as the overall dimensions of the array shown in the FIG. 3A arrangement), can be 10 times larger than in case of the FIG. 3A arrangement. Thus, instead of requiring use of a pinhole having a diameter as small as 10-15 microns, the "synthetic pinhole-photodiode" plurality of photosensors having an overall diameter 100-150 microns can be formed using a CCD target, for example, with a modest pixel size of 15-20 microns, which allows for reliable computer control of the position of the selected plurality of elements. Such computer control of the plurality thereby provides for the electronic adjustment of the non-common phase difference to modulo $2\pi$ between adjacent sub-apertures. This particular alternative is not specifically shown in the Figures and element 500-123 is representative thereof.

Thus, as described above, the output aperture in these embodiments are composed from densely packed hexagon lenses (where lenses 200-1, 200-2 and 200-3 are illustrative of a scalable unit) with almost 100% fill factor. In an alternative embodiment, square lenses can be used for rectangular packing of beamlets, however the hexagon lenses and corresponding honeycomb arrangement of beamlets has better CBC performance. The collimating lenses can be attached together on a transparent superstate, as described below in conjunction with FIG. 11, or attached to each other via adhesion (such as using glue or other bonding techniques) along their respective edges.

The summarized output beam leaving the array is formed with densely packed collimated beams, each having a hexagonal cross-section.

The set of concave micro-mirrors 400-123 is placed outside of the output aperture, with the center of each micro-mirror coinciding with the common vertex of three adjacent collimator lenses, such as lenses 200-1, 200-2 and 200-3. In a scaled arrangement, the multiple micro-mirrors can be attached to a second transparent superstate, as also described below in conjunction with FIG. 11.

The corners of these of the three lenses 200-1, 200-2 and 200-3 are cut so as to provide the opening d of vertex 200-123 to be significantly less than the diameter D of micro-mirror 400-123.

The micro-lens 200-123 is placed into the opening at a position so as to obtain the highest possible fill factor. In the illustrated embodiment, the micro-lens 200-123 is considered as a round concave of convex spherical lens.

The micro-mirror 400-123 intercepts the fractions (sub-beams) of the three collimated beams 1C, 2C and 3C in the vicinity of the hole and reflects these three sub-beams back to the micro-lens.

The micro-mirror 400-123 is coupled optically with the micro-lens 200-123 and forms a telescopic system that provides focusing of the three sub-beams behind the array, preferably behind the laser sources. At the plane where these three sub-beams are overlapping, the constructive interference is formed.

The pinhole of the pinhole-photodetector assembly 500-123 selects the spot of the interference pattern and the photodetector behind of pinhole provides the signal for phase locking of the three output beams.

The pinhole-photodetector assembly is placed on a movable platform. X-Y displacement (manual or computerized) of the movable platform provides the control of the non-common path difference between wave fronts of three sub-apertures to tune this difference to modulo $2\pi$.

In an embodiment having the fore mentioned "synthetic pinhole-photodiode" the plurality of photosensor elements are selected by computer control so as to electronically move this plurality (and thereby simulate the pinhole and fore noted X-Y displacement) so as to match the non-common phase difference between the adjacent sub-apertures to modulo $2\pi$.

The mask positioned in-between the laser sources and the output lenses provides the clipping of periphery areas of the respective divergent beams so as to avoid parasitic illumination of neighbor lenses. This mask intercepts and dissipates the parasitic power in these intercepted beam tails.

Figure 5:
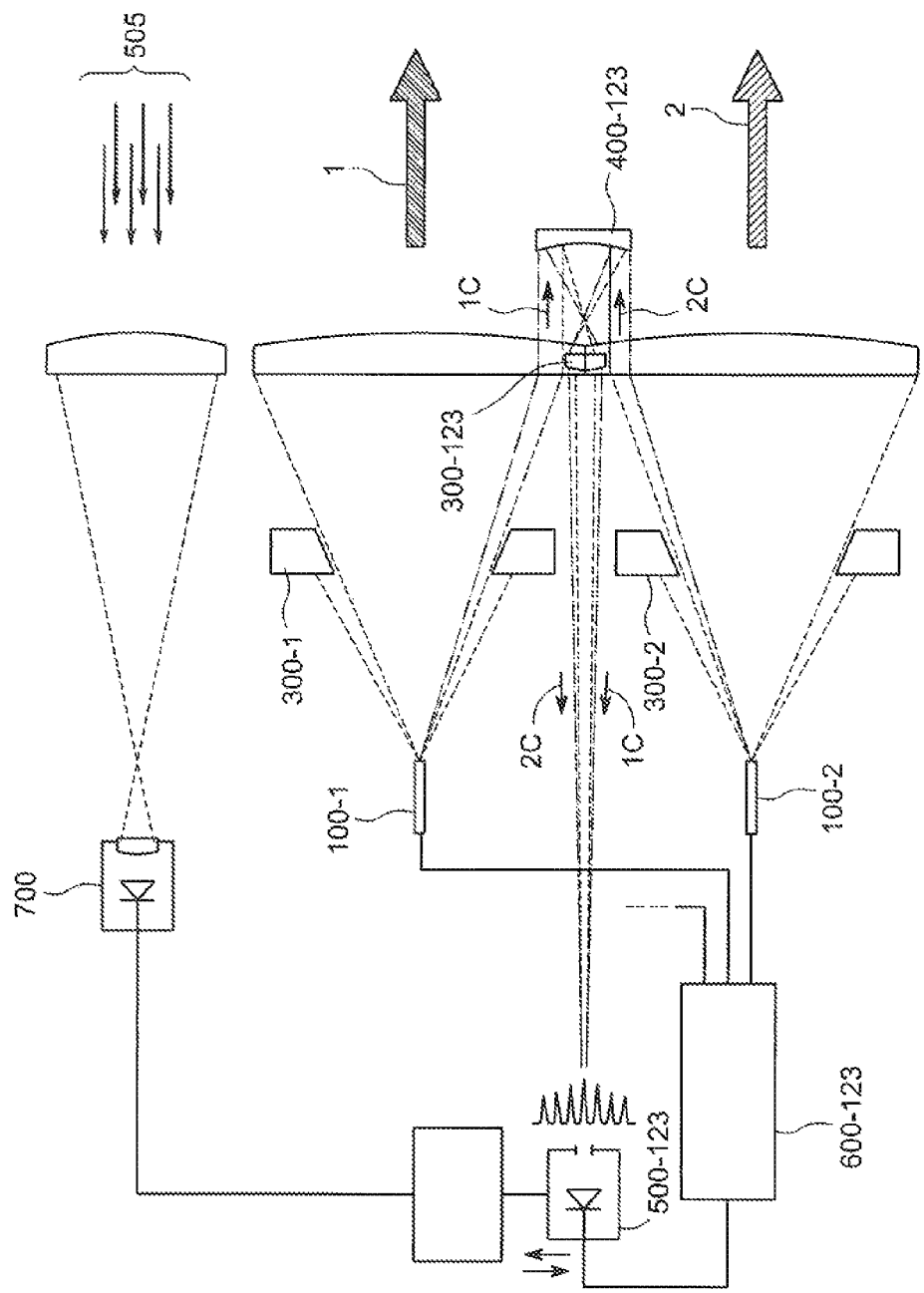
FIG. 5 illustrates a schematic view of another embodiment of method and apparatus for coherent beam combining in an array of laser beam collimators that is similar to FIG. 4, but includes 2 external feedback loops.

FIG. 5 illustrates a schematic view of another embodiment of method and apparatus for coherent beam combining in the array of laser beam collimators that is similar to FIG. 4, but includes 2 feedback loops.

Loop 1: mirror 400-123, micro-lens 300-123, pinhole-photodetector assembly 500-123, provide the input signal for phase-locking of beams 1, 2, 3 (beam 3 not shown) through the use of the phase shifter processor 600-123.

Loop 2: photo-receiver 700 receives the photons 505 returned by the target, for providing the input for control of the X-Y position of the pinhole-photodetector assembly 500-123 for optimization of non-common path differences between wave fronts of beams 1, 2 and 3.

Figure 6:
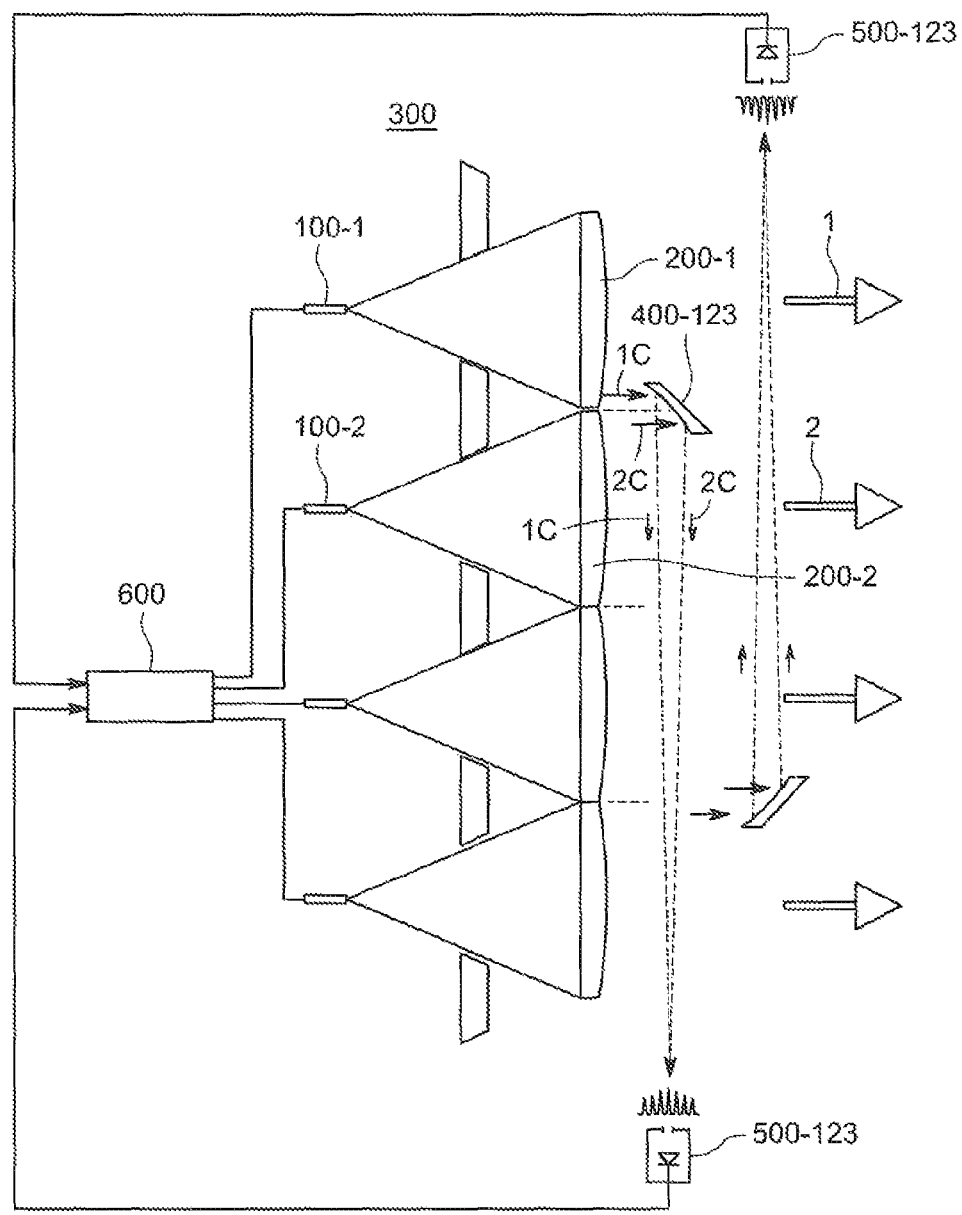
FIG. 6 illustrates a schematic view of another embodiment of a method and apparatus for coherent beam combining in an array of laser beam collimators that is similar to FIG. 4, but where the micro-mirror re-directs the sub-beams to a sensor located outside of the array rather than inside of the array.

FIG. 6 illustrates a schematic view of another embodiment of a method and apparatus for coherent beam combining in an array of laser beam collimators that is similar to FIGS. 4 and 5, but where the micro-mirror 400-123 re-directs the sub-beams to a sensor located outside of the array rather than inside of the array. Thus, as shown in FIG. 6, micro-mirror 400-123, representative of a scalable unit for three sub-beams in the arrangement, re-directs the sub-beams 1C, 2C and 3C to a sensor 500-123 positioned outside of the array, and specifically at an outer edge thereof. FIGS. 13 and 14, described below, show additional details of such an arrangement.

Figure 7:
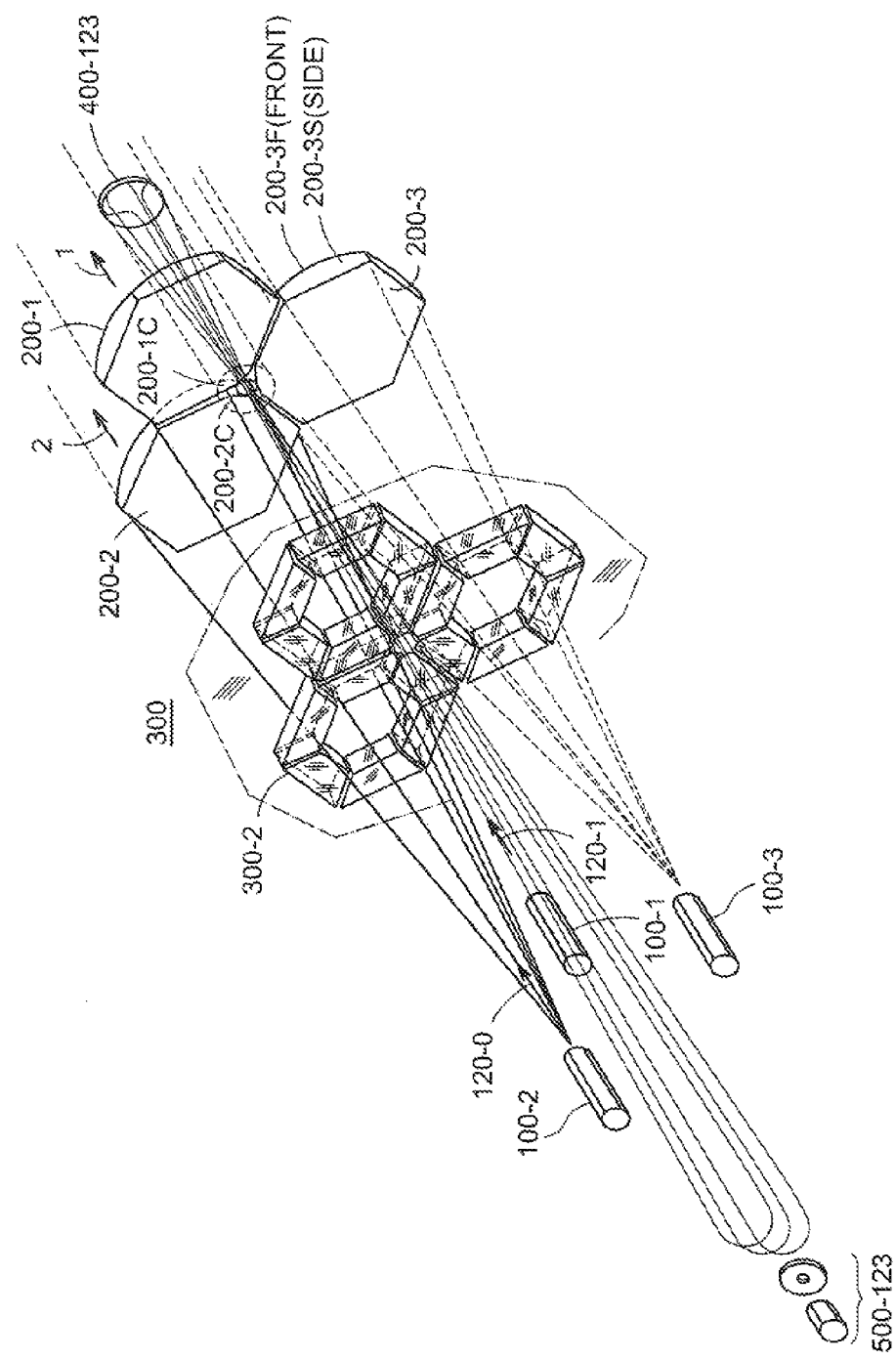
FIG. 7 illustrates a rear perspective view of the FIG. 4 embodiment.

FIG. 7 illustrates a rear perspective view of the FIG. 4 embodiment for further illustration of the FIG. 4 embodiment. No further description is deemed necessary.

Figure 8:
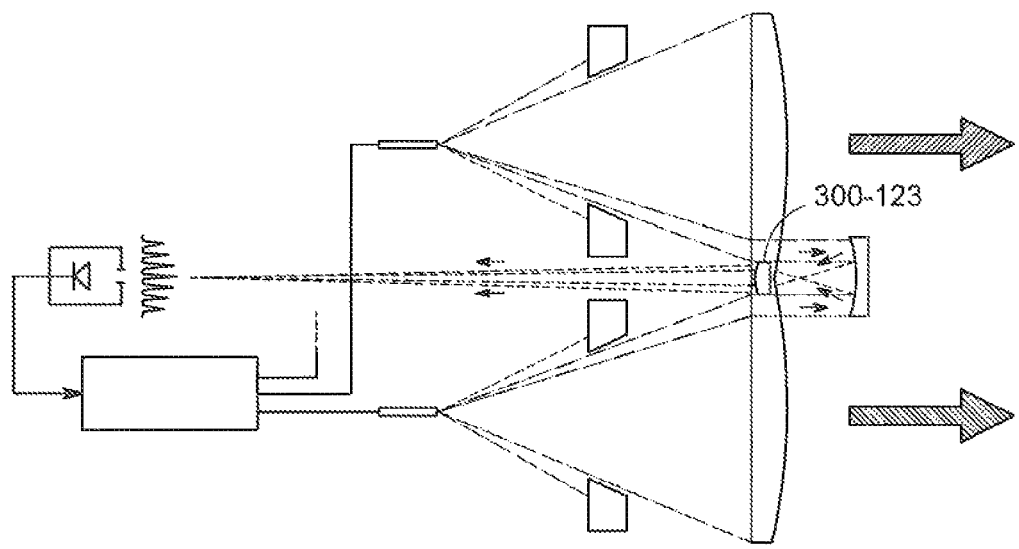
FIG. 8 illustrates a schematic view of another embodiment of a method and apparatus for coherent beam combining in an array of laser beam collimators that is similar to FIG. 4, where the micro-lens is a positive lens.

FIG. 8 illustrates a schematic view of another embodiment of a method and apparatus for coherent beam combining in the array of laser beam collimators that is similar to FIG. 4, where micro-lens 300-123 is a positive lens. No further description is deemed necessary.

Figure 9:
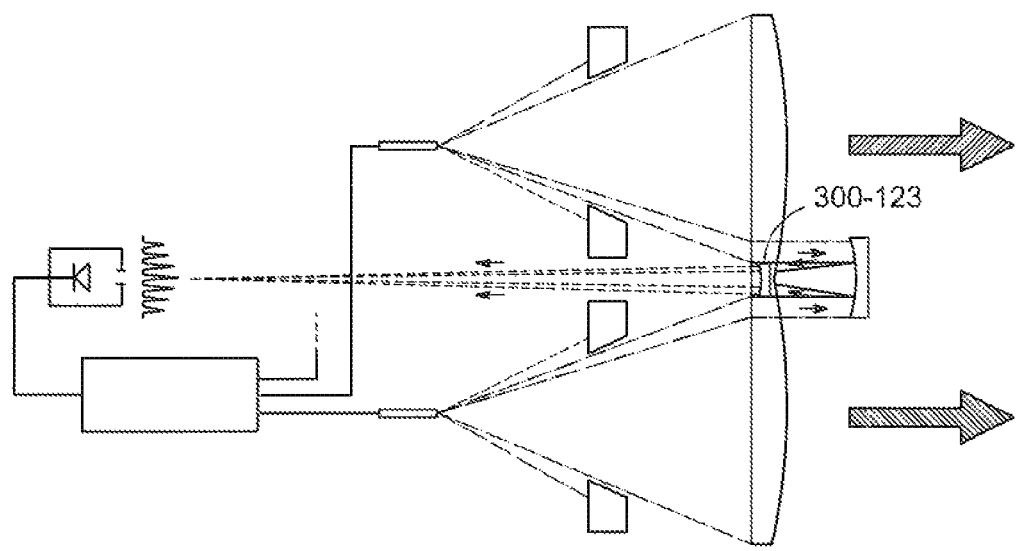
FIG. 9 illustrates a schematic view of another embodiment of a method and apparatus for coherent beam combining in an array of laser beam collimators that is similar to FIG. 4, where the micro-lens is a negative lens.

FIG. 9 illustrates a schematic view of another embodiment of a method and apparatus for coherent beam combining in the array of laser beam collimators that is similar to FIG. 4, where micro-lens 300-123 is a negative lens. No further description is deemed necessary.

Figure 10:
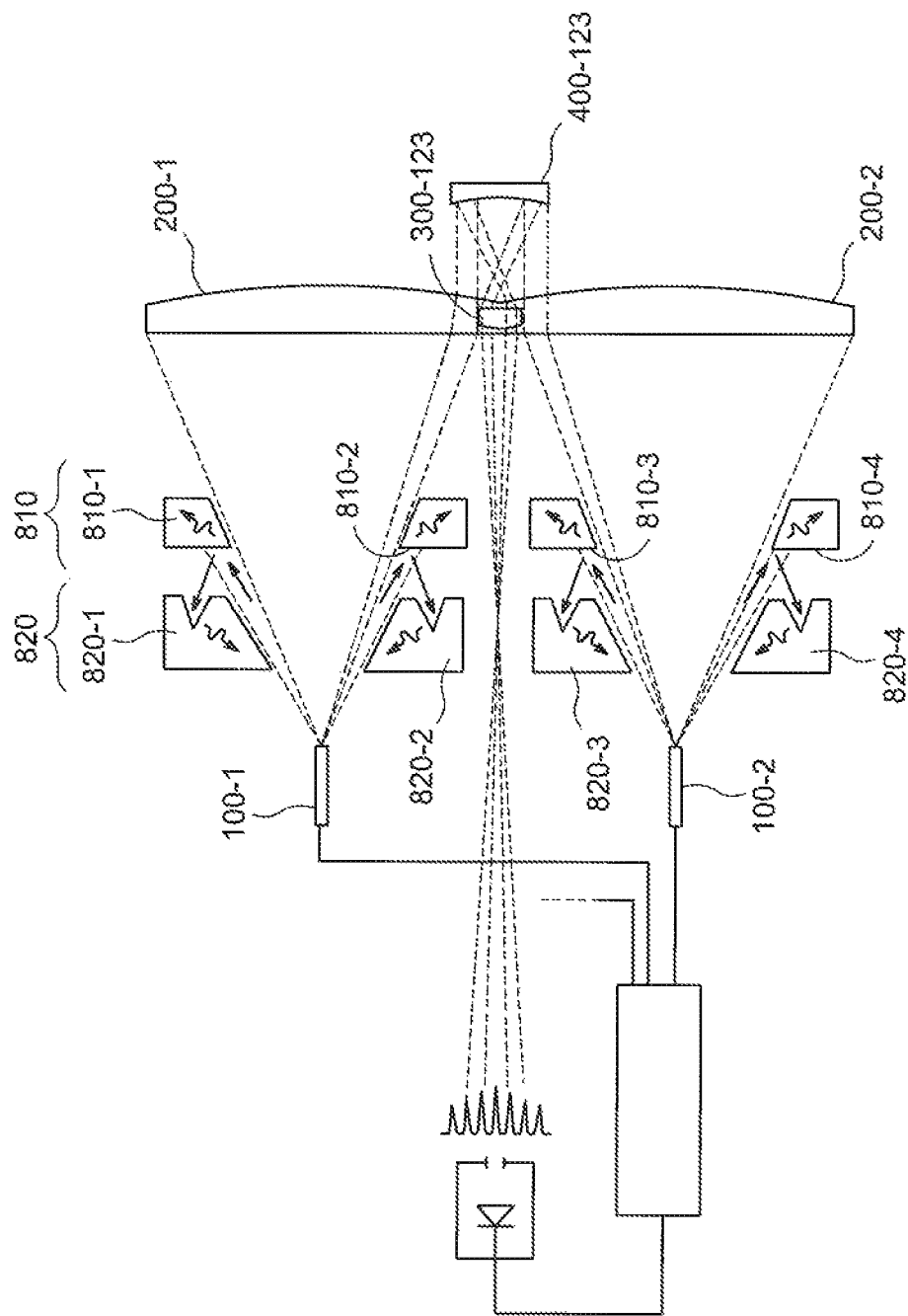
FIG. 10 illustrates a schematic view of another embodiment of a method and apparatus for coherent beam combining in an array of laser beam collimators that is similar to FIG. 4, and includes details of mask apparatus for the interception and dissipation of power of the periphery areas of the Gaussian beams.

FIG. 10 illustrates a schematic view of another embodiment of a method and apparatus for coherent beam combining in the array of laser beam collimators that is similar to FIG. 4, and is useful for explaining details of the mask apparatus for the interception and dissipation of power of the periphery areas of the divergent beams.

A mask assembly comprises nodes 810 and 820 (corresponding to one embodiment of the masks 300 of FIGS. 4 and 5). Node 810 comprises partly-reflecting-partly-absorbing mirrors 810-1, 810-2, 810-3, 810-4, for intercepting periphery areas of the respective divergent beams from fiber lasers 100-1 and 100-2. Part of the intercepted power is absorbed in node 810, and part of the power is reflected to node 820, which includes radiation traps 820-1, 820-2, 820-3, 820-4. Nodes 810 and 820 are supplied with inside channels (not shown) which includes circulating gas or liquid for conducting and disposing the parasite heat generated by the trapping and reflection of the radiation, to an area outside of the array (not shown).

Figure 11:
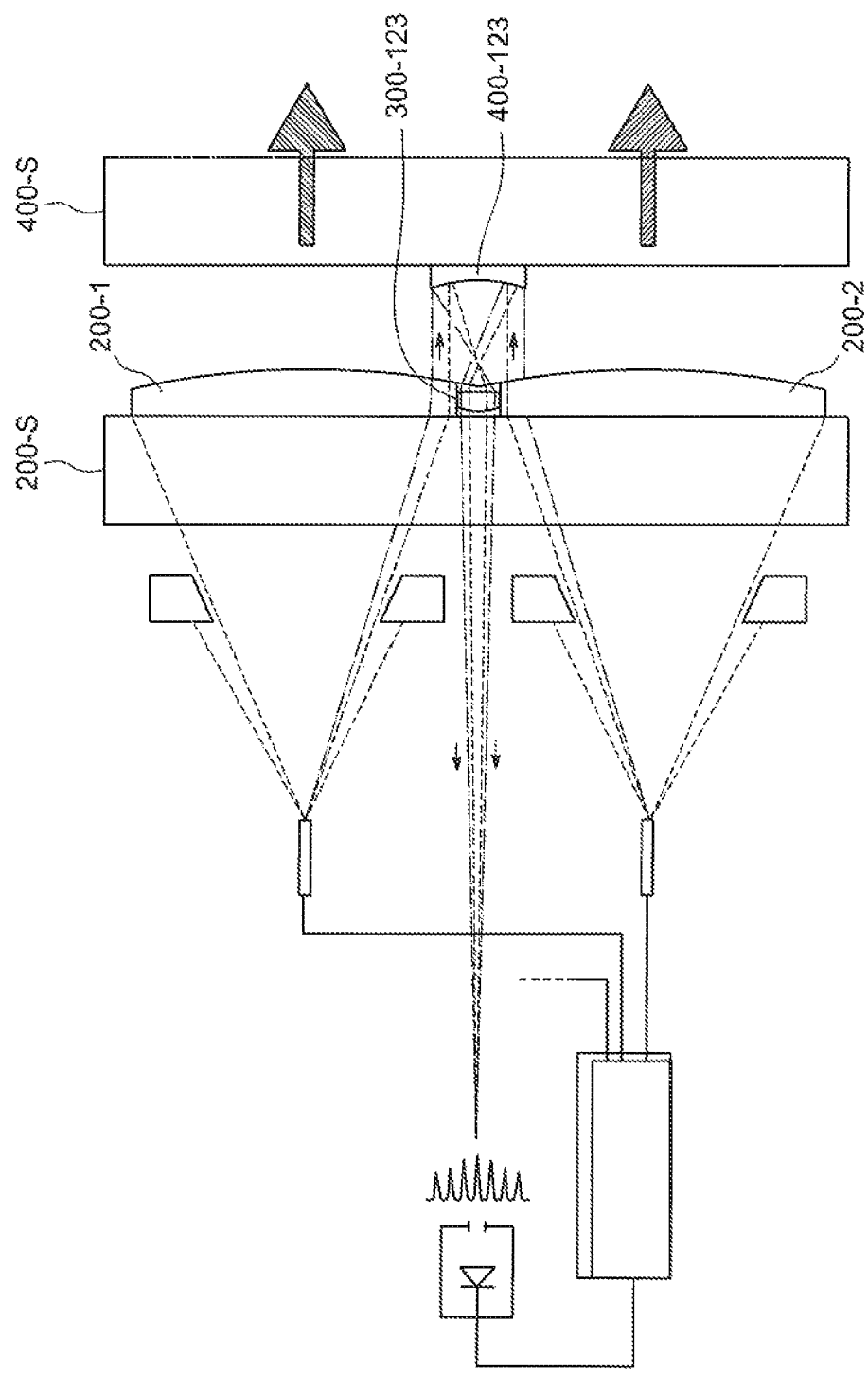
FIG. 11 illustrates a schematic view of another embodiment of a method and apparatus for coherent beam combining in an array of laser beam collimators that is similar to FIG. 4, and includes superstrates for supporting the collimator lenses and micro mirrors.

FIG. 11 illustrates a schematic view of another embodiment of a method and apparatus for phase-locking of a plurality of laser beams in the array of laser beam collimators that is similar to FIG. 4, and includes a transparent superstrate 200-S for supporting the output lenses 200-1, 200-2, 200-3 (lens 200-3 not shown) and focusing lens 300-123, and a transparent superstrate 400-S supporting the mirror 400-123.

In a test-bed for investigating the performance of coherent beam combining for arrays up to 19 channels, the distance between output sub-apertures was 37 mm. In an embodiment for 100% fill factor, the lenses also had a hexagon shape with a size of 37 mm. The mode field diameter of the operating fiber lasers was about 7 μm and the optimum focal length of lenses was 174 mm.

Figure 12:
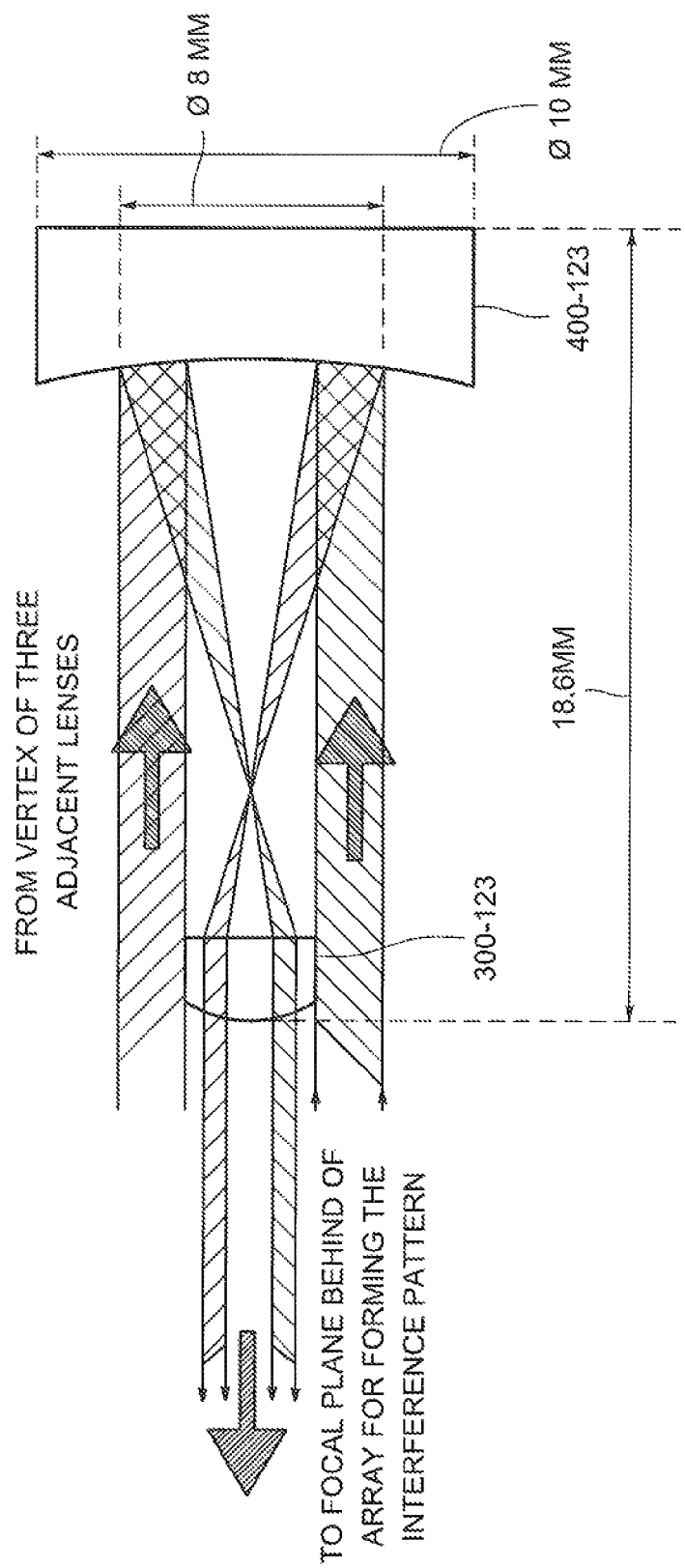
FIG. 12 illustrates an evaluation of power conditions for the micro-mirror embodiments described in the prior Figures.

Evaluation of power conditions for micro-mirror embodiments is now described in conjunction with FIG. 12 illustrating mirror 400-123 and microlens 300-123. The full power incident on a micro-mirror 400-123 having a diameter D=8 mm was determined at distance L=174 mm to be equal to 0.16 mW. If the effective diameter d of the vertex 200-123 shown in FIG. 4 is equal to 4 mm, the effective power on the mirror is reduced by 0.04 mW and is equal 0.16-0.04=0.12 mW. this is a small fraction of total power 19 mW: 0.12 mW/19 mW=0.6%. At a power of 1 kW per fiber laser channel, the full power at the mirror will be 3 kW. The fraction of power which will hit the micro-mirror can be estimated as 19 W, which power needs to be dissipated, for example by cooling of the micro-mirror.

Considering a small decrease of the diameter of the micro-mirror to D=6 mm, the intercepted power decreases to about two times less and is estimated to be as low as 9 W. Considering a gold reflective coating, the absorbed power will be only about 2%, that is heating with about 200 mW is expected, which can be easily handled with a modest cooling of the micro-mirror.

Another solution would be to use a semitransparent reflecting coating for the micro-mirrors, for instance a dielectric mirror having a small reflecting coefficient or a very thin semi-transparent metal film. The excess radiation will pass though the mirror and will be dissipated outside of the array. The dissipated radiation of the passed beam will be on the order of units of Watt and is not focused or collimated and is not a significant threat to ambient at distances of tens of meters from array. For security, a simple blending tube, positioned around the power beam will totally solve the problem of this parasitic scattering.

FIG. 13 illustrates a schematic view of another embodiment of a method and apparatus for coherent beam combining in an array of laser beam collimators that is similar to FIG. 4, but where no mask is used to pre-shape the laser beams so as to match the collimator lenses. Thus, the full Gaussian beams are allowed to hit the plurality of densely packed lenses. In such an embodiment about 95% of each Gaussian beam fills the corresponding output lens, and about 5% becomes parasitic radiation. Additionally, reflecting by the micro-mirror 400-123 is to a sensor 500-123 positioned adjacent to the array as shown in FIG. 6), rather than through the array. A mount 1302 is provided to support the optical sensor 500-123 at the appropriate position adjacent to the output aperture of the array. Because no mask elements are provided, a parasitic portion from each of the laser beams will pass through a neighboring, non-corresponding collimating lens and not be reflected by a corresponding micro-mirror. For example, the parasitic beam from laser 1 that passes through lens 200-2 is illustrated as 1P-2, the parasitic beam from laser 2 that passes through lens 200-1 is illustrated as 2P-1 and the parasitic beam from laser 2 that passes through lens 200-3 is illustrated as 2P-3. Due to the size and positioning of the various micro-mirrors 400-123, none of these parasitic beams are reflected and are undesirably included in the output aperture. Accordingly, a tube 1304 having a diameter slightly larger than the output aperture is attached to mount 1302 and extends in the direction of the propagation of the collimated laser beams by an appropriate amount sufficient to reflect and/or absorb these parasitic beams. In this regard, a reflective and/or absorptive layer 1306 is provided on the interior surface of tube 1304.

FIG. 14 illustrates a schematic view of a transport superstate for accommodating the micro-mirror shown in FIG. 6 and FIG. 13. A superstrate 1402 having an antireflective coating is positioned across the diameter of mount 1302. An appropriately positioned hole 1404 in superstrate 1402 supports a post 1406 which positions micro-mirror 400-123 at the appropriate position. Additional holes and posts are provided, not specifically shown, for supporting additional micro-mirrors in the arrangement.

Advantages of the disclosed embodiments:
Bulky beam splitters are not needed to lock the phases of all fiber laser beams before they propagate the tactical distance.

The power in the vertex of three adjacent lenses is small as units of Watts at laser beam powers in the kW range, owing to strong decay of intensity of the divergent beams at a distance far from their central axes.

The micro-mirrors and micro-lenses used for intercepting the fractional beams and reflecting/refocusing them back to a sensor, either through or adjacent to the array, have a much lower cost than the diffractive optic elements used in the prior art techniques, and do not require special precautions for alignment and heat dissipation.

The substantial fill factors achieved with the disclosed embodiments, such as 100% when a mask is used and 95% in an embodiment without a mask, achieves more than 15% more power (for a 7 channel array) in beam combination than current arrays having circular lenses.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings, as noted several places in the above descriptions. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. Apparatus for coherent beam combining in an array of laser beam collimators, comprising:
an array of a plurality collimating lenses, each lens intercepting a respective one of a plurality of divergent laser beams, each divergent laser beam having a Gaussian profile, wherein each collimating lens is joined with adjacent collimating lenses such that an output aperture is formed with a common vertex of the adjacently joined collimating lenses;

a concave mirror positioned a distance from the common vertex for receiving a fraction of each of the collimated laser beams that passed through a portion of each of the collimating lenses that are adjacent to the common vertex, and providing reflected fractional collimated laser beams; and a sensor for intercepting the reflected fractional collimated laser beams so as to provide a signal that is applied to synchronize the phase of each of the collimated laser beams.

2. The apparatus of claim 1 further including a a plurality of mask elements, each mask element having a shape adapted for clipping of periphery areas of a respective one of each of the divergent laser beams so as to pass a substantial portion of the Gaussian profile of the divergent laser beam therethrough and toward a correspondingly shaped one of the collimating lenses.

3. The apparatus of claim 2, wherein the shape of the mask elements and the collimating lenses is hexagonal.

4. The apparatus of claim 2, wherein the mask elements clip substantially 100% of the Gaussian profile of the divergent laser beams that pass therethrough.

5. The apparatus of claim 1, wherein the concave mirror is positioned so as to reflect the fractional collimated laser beams through the vertex to a sensor positioned on a side of the array opposite the output aperture of the array.

6. The apparatus of claim 1, wherein the concave mirror is positioned so as to reflect the fractional collimated laser beams to a sensor positioned adjacent to the output aperture of the array.

7. The apparatus of claim 1, wherein the sensor comprises a pinhole and photodiode assembly.

8. The apparatus of claim 1, wherein the sensor comprises an imager having a plurality of photosensor elements that simulate a pinhole and photodiode assembly.

9. The apparatus of claim 4, wherein the mask elements comprise a node of a plurality of partly-reflecting-partly-absorbing mirrors, each mirror for intercepting periphery areas of a respective one of the divergent laser beams.

10. The apparatus of claim 9, wherein the mask elements further comprise a node of a plurality of radiation traps, each radiation trap receiving a periphery area of the divergent laser beam that is reflected by a corresponding one of the partly-reflecting-partly-absorbing mirrors.

11. A method for phase-locking a plurality of coherent laser beams in an array of laser beam collimators, comprising:

providing an array of plurality of adjacently positioned laser beam sources for projecting a corresponding plurality of divergent laser beams having a Gaussian profile along a corresponding plurality of predetermined paths;

positioning a respective one of a plurality of collimating lenses in the predetermined path of each of a respective corresponding one of the divergent laser beams so as to provide at an output of each collimating lens a corresponding collimated laser beam, and wherein each collimating lens is joined with adjacent collimating lenses such that an output aperture of the array is formed with a common vertex of the adjacently joined collimating lenses;

positioning a concave mirror a distance from the output aperture so as to receive a fraction of each of the collimated laser beams that passed through a portion of each of the collimating lenses that are adjacent to the common vertex, and provide reflected fractional collimated laser beams; and intercepting the reflected fractional collimated laser beams with a sensor so as to provide a signal that is applied to synchronize the phase of the laser beam sources that provided the fractional collimated laser beams.

12. The method of claim 11, where positioning the collimating lenses comprises positioning respective ones of the collimating lenses so that they receive a substantial portion of the Gaussian beam profile of a corresponding one of the divergent laser beams.

13. The method of claim 12, wherein said substantial portion is in the range from 90 to 100%.

14. The method of claim 12, further including positioning in the predetermined path of each divergent laser beam a corresponding one of a plurality of mask elements, each mask element having a shape adapted for clipping of periphery areas of a respective one of each of the divergent laser beams so as to pass a substantial portion of the Gaussian profile of the divergent laser beam therethrough and toward a correspondingly shaped one of the collimating lenses, thereby causing said substantial portion to be substantially 100%.

15. The method of claim 11, where the shape of the collimating lenses is hexagonal.

16. The method of claim 11 where positioning a concave mirror comprises positioning of the concave mirror so as to reflect the fractional collimated laser beams through the common vertex of the output aperture to a sensor positioned on a side of the array opposite the output aperture of the array.

17. The method of claim 11, where positioning a concave mirror comprises positioning of the concave mirror so as to reflect the fractional collimated laser beams to a sensor positioned adjacent to the output aperture of the array.

18. The method of claim 11, where intercepting comprises using as the sensor a pinhole and photodiode assembly.

19. The method of claim 11, where intercepting comprises using as the sensor an imager having a plurality of photosensor elements that simulate a pinhole and photodiode assembly.

20. The method of claim 14, positioning a corresponding one of a plurality of mask elements comprises positioning a node of a plurality of partly-reflecting-partly-absorbing mirrors, each mirror for intercepting periphery areas of a respective one of the divergent laser beams, and positioning a node of a plurality of radiation traps, each radiation trap receiving a periphery area of the divergent laser beam that is reflected by a corresponding one of the partly-reflecting-partly-absorbing mirrors.

* * * * *